Aug. 14, 1956  J. E. JENDRISAK  2,758,422
MOLD FOR SHAPING GLASS SHEETS
Original Filed July 30, 1949

Inventor
Joseph E. Jendrisak
By Nobbe & Swope
Attorneys.

United States Patent Office 2,758,422
Patented Aug. 14, 1956

2,758,422

MOLD FOR SHAPING GLASS SHEETS

Joseph E. Jendrisak, Rossford, Ohio, assignor to Libbey-Owens-Ford Glass Company, Toledo, Ohio, a corporation of Ohio Original application July 30, 1949, Serial No. 107,699. Divided and this application August 28, 1952, Serial No. 308,006

6 Claims. (Cl. 49—67)

This invention relates to molds that are used in the shaping of glass sheets that are employed as curved windows particularly in automobiles, and is a division of my copending application Serial No. 107,699, filed July 30, 1949, and which has now become abandoned.

If certain precautions are taken, glass sheets that have been ground and polished while flat may be curved to correspond to the contour of a vehicle body without losing the optical qualities required for good vision. Of these precautions it is necessary, in particular, to minimize the local stresses in the glass sheets during the bending operation. It is therefore desirable to provide continuous shaping surfaces that conform to the marginal area of the shaped glass sheet and to provide guide means, or supporting structures, to support as uniformly as possible the ends of the glass sheet as it is heated to softening temperature and allowed to sag into contact with the shaping surface.

It is therefore an object of this invention to provide a glass bending mold with at least one special type of guide plate arranged to support a sharp edge of a glass sheet during a bending operation, the guide plate being shaped so that the supported edge of the glass sheet moves smoothly over said plate from its initial position to its final position as the glass sags into contact with the shaping surface.

Another object of the invention is to provide a guide plate that is contoured to form an extension of the shaping surface so that the guide plate assists in shaping the glass as the glass settles toward the shaping surface.

A still further object of the invention is to provide means whereby the friction resisting relative movement between the glass and the guide plate is overcome so that the sharp edge of the glass moves uniformly across the guide plate as the sheet of glass sags toward the mold shaping surface.

A still further object of the invention is to provide a plurality of fingers, or finger and bar combinations, at least one for each of a plurality of guide plates, the fingers being interconnected and the fingers or bars bearing against the flat edges of the glass to insure uniform movement of both ends of the glass over the associated guide plates as the glass settles to its final form.

More specific objects and advantages are apparent from the following description of preferred forms of the invention.

According to the invention a substantially solid guide plate is attached to the mold or mold framework in position to extend beyond the end of the shaping surface as a continuation of that surface. In the construction of the mold itself, the guide plate is preferably attached before the shaping surface is machined to final form and the same machine that contours the shaping surface also contours the guide plate thus automatically insuring that the guide plate is a smooth continuation of the shaping surface. The guide plate is designed and its contour arranged according to the outline of the glass sheet to be bent so that full contact between the sharp edge of the glass sheet and the guide plate is maintained throughout the travel of the edge of the glass sheet as the sheet bends to final form. When more than one guide plate is employed, particularly when guide plates are located at opposite ends of a horizontally positioned glass sheet it is desirable to provide interconnected fingers operating in slots in the guide plates to make sure that both ends of the glass sheet move equal amounts as the glass sheet settles onto the mold. Without such fingers, or bar and finger combinations, one end of the glass sheet is apt to stick on its guide plate with the result that the other end moves too far and the glass sheet does not settle into proper position on the mold.

Preferred forms of the glass bending molds embodying the invention are illustrated in the following drawings.

These specific figures and the accompanying description are intended merely to illustrate the invention but not to limit its scope.

Figure 1:
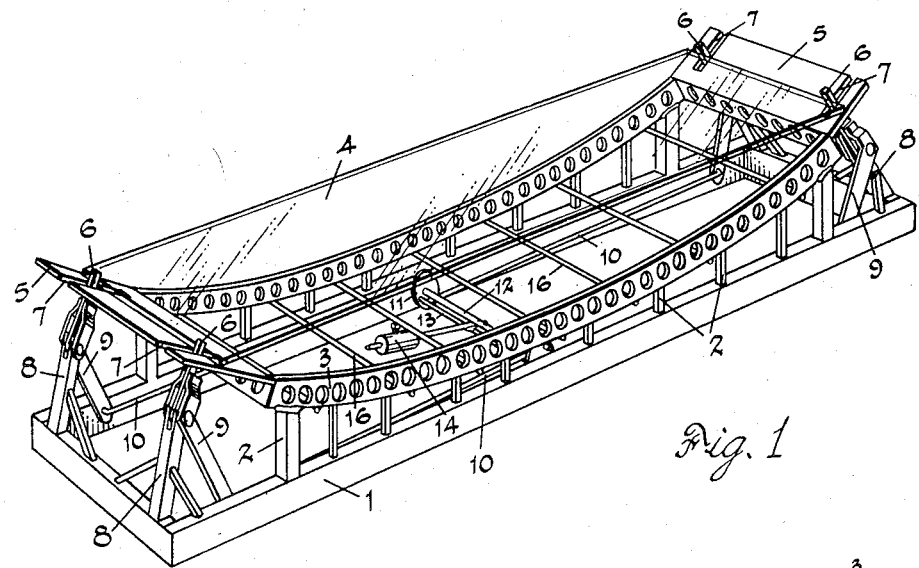
Figure 1 is a perspective view of an improved mold for producing a bend in a relatively long piece of glass.
Figure 2:
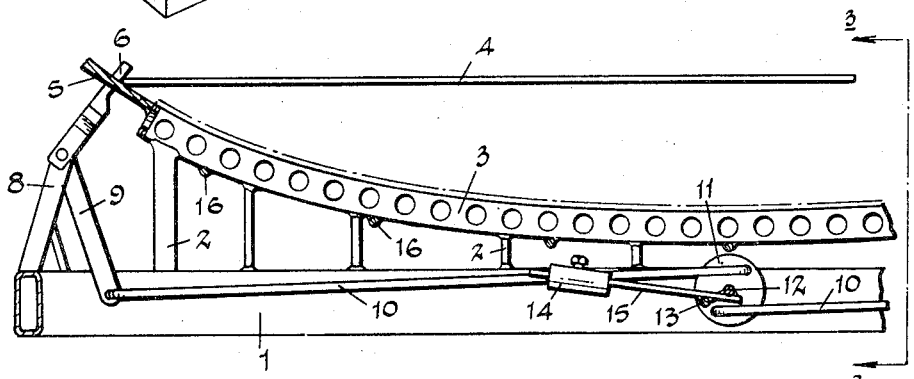
Figure 2 is a vertical longitudinal section of the mold shown in Figure 1 to illustrate the interconnected fingers that follow the edges of the glass as the edges slide down the guide plates.
Figure 3:
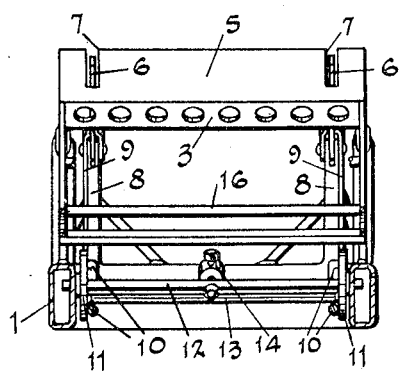
Figure 3 is a vertical transverse section as viewed from the line 3—3 of Figure 2.

Referring to Figure 1, wherein is illustrated one form of mold embodying the invention, the mold comprises a generally rectangular frame 1 from which a plurality of posts 2 are erected to support a generally rectangular mold strip 3. The mold strip 3 is mounted on edge so that its upper surface may serve as a shaping surface that conforms to the marginal area of a glass sheet 4 after the sheet has been bent to its final form. The mold strip or strips 3, mounted from the posts 2, are perforated at closely spaced intervals to reduce the mass of strip and thus the heat load applied to the furnace as the molds are passed therethrough. A guide plate 5 is provided at each end of the mold and arranged so that its surface extends as a continuation of the shaping surface, i. e., the upper surface of the strips 3, of the mold. These guide plates 5 are carefully designed so that the lower sharp edge of the glass sheets 4 resting thereon bear uniformly across the length of each guide plate as the edge of the glass moves during the bending operation.

To prevent one edge of the glass sheet from sticking to its supporting guide plate 5 and thus causing the plate to settle non-uniformly a plurality of fingers 6 are provided, there being at least one for each of the guide plates. 5. The upper ends of the fingers 6 extend upwardly through slots 7 in the guide plates 5 while the lower ends of the fingers are pivotally mounted on the upper ends of posts 8 erected from the base frame 1. Each of the fingers 6 has a downwardly directed arm 9, the lower ends of which arms are pivotally connected through rods 10 to disks 11 mounted near the ends of a shaft 12 that is journaled between the sides of the frame 1 midway between the ends of the frame. The disks 11 are further interconnected by a bar 13 arranged parallel to the shaft 12.

To provide force tending to move the upper ends of the fingers 6 toward the shaping surface of the strips 3 a weight 14 is mounted near the end of a lever 15, the other end of which is inserted between the bar 13 and shaft 12, the lever passing over the bar 13 and under the shaft 12 and being welded to each.

In this mold, the frame 1 with the posts 2 and the strips 3 which are further reinforced by cross ties 16 constitutes a framework having an upstanding rim forming a generally concave shaping surface. The guide plates 5 furnish support for the glass sheet 4 during the bending operation and the fingers 6 which are interconnected by the rods 10, disks 11 and shaft 12 are urged against the ends of the glass by force exerted by the weight 14, the applied force being just sufficient to overcome the friction between the glass and the guide plates 5. While two fingers 6 are shown at each end of the mold—two for each guide plate 5—satisfactory control of the glass may be obtained through the use of one finger at each end since the only purpose of the fingers is to prevent all of the sliding motion between the glass and the guide plates from taking place at one end of the glass sheet.

In making certain types of bends it may be found that the pressure of the fingers at the edge of the glass sheet will result in a slight distortion in the margin of the bent glass adjacent the points where the fingers contact the glass. Even in severe bends this will probably be so slight that it will not be apparent to the naked eye. However, when the bent sheet is laminated with a second bent sheet and a plastic interlayer, such distortion can produce let-goes in the finished lamination.

Figure 4:
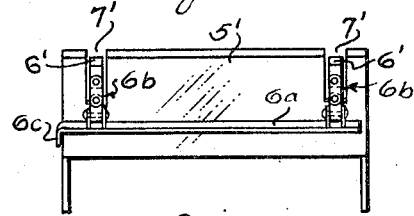
Figure 4 is a fragmentary plan view of a slightly modified form of the mold of Figures 1 to 3 employing the finger and bar combination of the invention for following and guiding the sheet edge.

To avoid this, a bar and finger combination such as shown in Figure 4 may be used to provide continuous contact along a greater area of the sheet edge or along the entire end edge area, during bending. Thus, in the modified form shown in this figure, a bar 6a is arranged to slide over the plate 7' in contact with the end edge of the sheet as it bends. This bar 6a is connected to the fingers 6' by universal connections 6b which permit the bar to maintain continuous engagement with both the sheet edge and the plate 7' and to accurately follow the desired path of movement of the sheet edge as determined by movement of the fingers 6'. The bar 6a is also provided with a flange 6c at one end thereof which acts as a locating means for the sheet and at the same time prevents undesired lateral movement thereof during bending.

In cases where a single finger is employed at an end of the mold, a bar similar to the bar 6a may be secured by a universal connection to the single finger.

Various modifications and changes in arrangement of the solid guide plates 5 as well as the glass locating members 6 and 6a may be made without departing from the spirit and scope of the invention.

Having described the invention, I claim:

1. In a mold for shaping glass sheets, in combination, a framework having an upstanding rim forming a generally concave shaping surface that conforms to the marginal area of a sheet of shaped glass, guide plates attached to each end of the framework with their upper surfaces forming continuations of the shaping surface, the plates serving as supports for holding a flat sheet of glass in bending relation to the shaping surface as the glass sags into contact with the shaping surface, at least one slot in each plate extending along the direction of movement of the glass, fingers pivoted on the frame with their upper ends extending through the slots, and linkage interconnecting the fingers at opposite ends of the framework to synchronize their movement toward the shaping surface, said linkage and fingers being unbalanced to urge the fingers toward the shaping surface with a force sufficient to overcome the friction between glass and guide plates to maintain the glass in bending relation to the shaping surface as it sags into contact with the shaping surface.

2. In a mold for shaping glass sheets, in combination, a framework having an upstanding rim forming a generally concave shaping surface that conforms to the marginal area of a sheet of shaped glass, guide plates attached to each end of the framework with their upper surfaces forming continuations of the shaping surface, said guide plates serving to support a glass sheet in bending relation to the shaping surface during a bending operation, at least one finger pivoted at each end of the framework and conditioned to urge the glass toward the shaping surface, and linkages interconnecting the fingers for synchronizing their movements, whereby the ends of the glass sheet supported on the guides move simultaneously toward the shaping surface.

3. In a mold for shaping glass sheets, in combination, a framework having a continuous rim forming a generally concave shaping surface conforming to the marginal area of a sheet of shaped glass, a guide plate rigidly attached to each end of the framework, said guide plates having shaped upper surfaces that conform to the paths followed by the supported edge of the glass sheet during a bending operation, said plates each having at least one slot generally parallel to the path of the supported edge of the glass sheet, a finger pivoted on the framework below each slot and extending through the slot, and means for urging the fingers toward the shaping surface, said means also serving to interconnect the fingers to synchronize their movements and being adjusted so that the force of the fingers against the edge of the glass is just sufficient to overcome the friction between the glass and the guide plates during movement of the edges of the glass on the guide plates.

4. In a mold for shaping glass sheets, in combination, a framework having a continuous rim forming a generally concave shaping surface conforming to the marginal area of a sheet of shaped glass, a guide plate rigidly attached to each end of the framework, said guide plates having shaped upper surfaces that conform to the paths followed by the supported edge of the glass sheet during a bending operation, said plates each having at least one slot generally parallel to the path of the supported edge of the glass sheet, a finger pivoted on the framework below each slot and extending through the slot, a bar adapted to move over said guide plate in contact with the edge of the sheet being bent and having a universal connection to the portion of the finger extending through said slot, and means for urging the fingers toward the shaping surface, said means also serving to interconnect the fingers to synchronize their movements and being adjusted so that the force of the fingers against the edge of the glass is just sufficient to overcome the friction between the glass and the guide plates during movement of the edges of the glass on the guide plates.

5. In a mold for shaping glass sheets, in combination, a framework having a substantially continuous rim conforming to the marginal area of a glass sheet after it has been bent on said mold and forming a generally concave shaping surface having a curvature conforming to the curvature of said bent sheet, substantially solid metal guide plates extending outwardly from opposite ends of said shaping surface and having their upper surfaces contoured to conform to the paths followed by the sharp edge corners of the glass sheet supported thereon during movement of the glass sheet in sagging from its flat to its bent state, and pivoted means for exerting force on the ends of the glass sheet to be bent as it rests on said guide plates and settles into conformity with said shaping surface.

6. In a mold for shaping glass sheets, in combination, a framework having a substantially continuous rim conforming to the marginal area of a glass sheet after it has been bent on said mold and forming a generally concave shaping surface having a curvature conforming to the curvature of said bent sheet, guide members extending outwardly from opposite ends of said shaping surface and having upper surfaces that are contoured to conform to the path followed by opposite sharp lower edge corners of the glass sheet supported thereon during movement of the sheet in sagging from its flat to its bent state, and pivotally mounted fingers at each end of said mold extending above the surfaces of said guide plates for exerting force on the ends of the glass sheet to be bent as it rests on said guide plates and settles into conformity with said shaping surface.

References Cited in the file of this patent

UNITED STATES PATENTS

| | | |
|---|---|---|
| 280,143 | De Voursney | June 26, 1883 |
| 1,999,558 | Black | Apr. 30, 1935 |
| 2,003,383 | Miller | June 4, 1935 |
| 2,452,488 | Paddock et al. | Oct. 26, 1948 |
| 2,554,572 | Jendrisak | May 29, 1951 |